United States Patent [19]
Jones, Jr.

[11] 3,987,374
[45] Oct. 19, 1976

[54] MULTI-LINE, MULTI-MODE MODULATOR USING BANDWIDTH REDUCTION FOR DIGITAL FSK AND DPSK MODULATION

[75] Inventor: Gardner D. Jones, Jr., Raleigh, N.C.

[73] Assignee: International Business Machines Corporation, Armonk, N.Y.

[22] Filed: Nov. 10, 1975

[21] Appl. No.: 630,473

Related U.S. Application Data

[62] Division of Ser. No. 525,699, Nov. 21, 1974, Pat. No. 3,958,191.

[52] U.S. Cl. .......................... 332/9 R; 179/15 BM; 325/39; 332/18; 332/21; 332/11 R
[51] Int. Cl.² ...................... H03C 3/02; H04J 3/04; H04J 9/00
[58] Field of Search ............... 332/9 R, 11 R, 16 R, 332/18, 21, 22; 325/39, 40; 179/15 BM

[56] References Cited
UNITED STATES PATENTS

| | | | |
|---|---|---|---|
| 3,611,209 | 10/1971 | Saltzberg | 332/9 R |
| 3,697,892 | 10/1972 | Lawrence et al. | 332/9 R |
| 3,828,279 | 8/1974 | Labarber et al. | 332/9 R X |

Primary Examiner—Siegfried H. Grimm
Attorney, Agent, or Firm—John B. Frisone

[57] ABSTRACT

A multi-line multi-mode modulator uses compatible digital modulation techniques for multifrequency (MF), frequency shift keyed (FSK) and differential phase shift keyed (DPSK) modulation to achieve a multi-line multi-mode modulator which is capable of handling a plurality of lines requiring a dynamic mix of the three modulation techniques. The compatible modulation techniques utilize bandwidth reduction schemes which enable the use of simple RC filters on each output line for the sole purpose of removing the quantizing noise introduced by the digital modulation technique.

8 Claims, 17 Drawing Figures

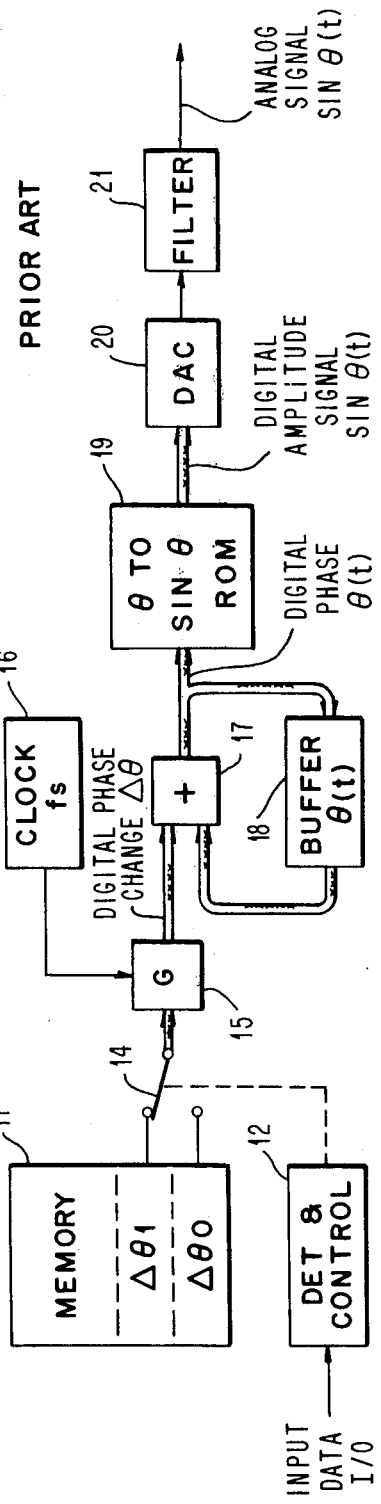
FIG. 1 PRIOR ART
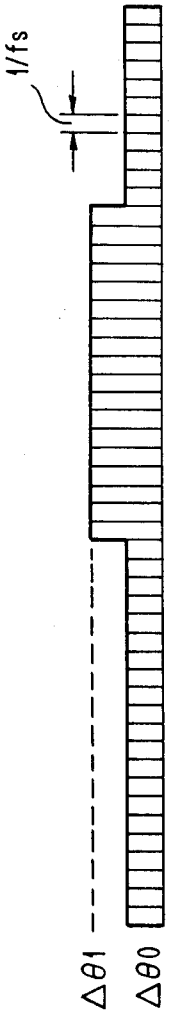
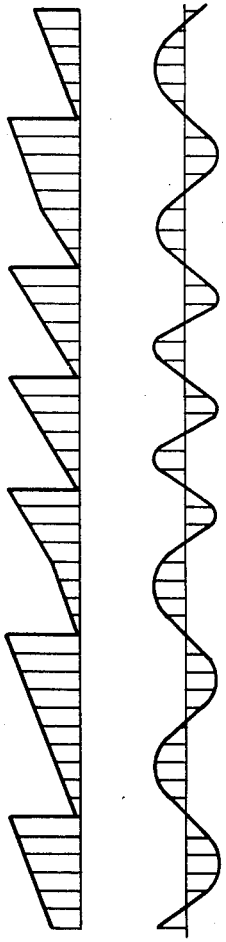
FIG. 1A DIGITAL PHASE CHANGE
FIG. 1B DIGITAL PHASE
FIG. 1C MODULATED ANALOG SIGNAL

FIG. 3

| MEMORY ADDRESS | MEMORY CONTENTS | LCW | DATA | $\tau$ $\overbrace{A\ B\ C}$ | | | C1 | C2 |
|---|---|---|---|---|---|---|---|---|
| i | T/8 FOR LINE TYPE 1 | 0 | X | $[A+B+C]\cdot\overline{A\cdot B\cdot C}$ | | | 1 | 0 |
| i+1 | 000········00 | 0 | 0<br>1 | 0<br>1 | 0<br>1 | 0<br>1 | 1 | 0 |
| i+2 | Δθ1 FOR TYPE 1 | 0 | X | 0 | 0 | 0 | 0 | 1 |
| i+3 | Δθ2 " " " | 0 | X | 0 | 0 | 1 | 0 | 1 |
| i+4 | Δθ3 " " " | 0 | X | 0 | 1 | 0 | 0 | 1 |
| i+5 | Δθ4 " " " | 0 | X | 0 | 1 | 1 | 0 | 1 |
| i+6 | Δθ5 " " " | 0 | X | 1 | 0 | 0 | 0 | 1 |
| i+7 | Δθ6 " " " | 0 | X | 1 | 0 | 1 | 0 | 1 |
| i+8 | Δθ7 " " " | 0 | X | 1 | 1 | 0 | 0 | 1 |
| i+9 | Δθ8 " " " | 0 | X | 1 | 1 | 1 | 0 | 1 |
| MEMORY ADDRESS | MEMORY CONTENTS | LCW | DATA | $\tau$ $\overbrace{A\ B\ C}$ | | | C1 | C2 |
| j | T/8 FOR LINE TYPE 2 | 1 | X | $[A+B+C]\cdot\overline{A\cdot B\cdot C}$ | | | 1 | 0 |
| j+1 | 000········00 | 1 | 0<br>1 | 0<br>1 | 0<br>1 | 0<br>1 | 1 | 0 |
| j+2 | Δθ1 FOR TYPE 2 | 1 | X | 0 | 0 | 0 | 0 | 1 |
| j+3 | Δθ2 " " " | 1 | X | 0 | 0 | 1 | 0 | 1 |
| j+4 | Δθ3 " " " | 1 | X | 0 | 1 | 0 | 0 | 1 |
| j+5 | Δθ4 " " " | 1 | X | 0 | 1 | 1 | 0 | 1 |
| j+6 | Δθ5 " " " | 1 | X | 1 | 0 | 0 | 0 | 1 |
| j+7 | Δθ6 " " " | 1 | X | 1 | 0 | 1 | 0 | 1 |
| j+8 | Δθ7 " " " | 1 | X | 1 | 1 | 0 | 0 | 1 |
| j+9 | Δθ8 " " " | 1 | X | 1 | 1 | 1 | 0 | 1 |

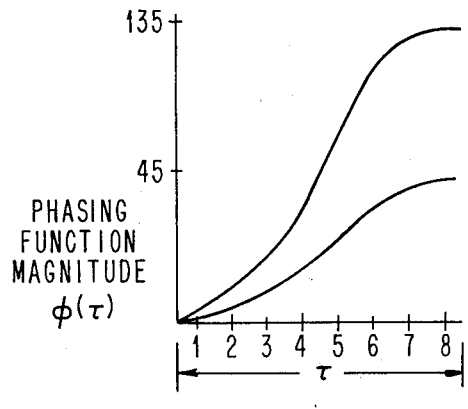

FIG. 4A

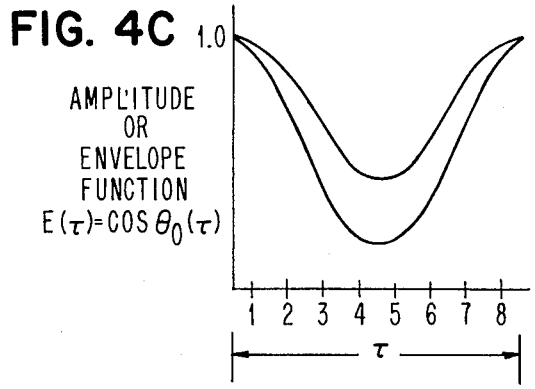

FIG. 4B

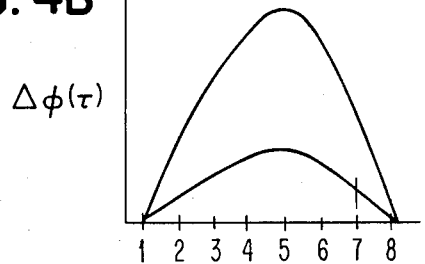

| MEMORY ADDRESS | MEMORY CONENTS | | LCW | D0 | D1 | D2 | D3 | C1 | C2 |
|---|---|---|---|---|---|---|---|---|---|
| i | $\Delta\theta_1$ FOR LINE TYPE 1 | fA1 | 0 | 0 | 0 | X | X | 1 | 0 |
| i+1 | $\Delta\theta_1$ FOR LINE TYPE 1 | fA2 | 0 | 0 | 1 | X | X | 1 | 0 |
| i+2 | $\Delta\theta_1$ " | fA3 | 0 | 1 | 0 | X | X | 1 | 0 |
| i+3 | $\Delta\theta_1$ " | fA4 | 0 | 1 | 1 | X | X | 1 | 0 |
| i+4 | $\Delta\theta_2$ " | fB1 | 0 | X | X | 0 | 0 | 0 | 1 |
| i+5 | $\Delta\theta_2$ " | fB2 | 0 | X | X | 0 | 1 | 0 | 1 |
| i+6 | $\Delta\theta_2$ " | fB3 | 0 | X | X | 1 | 0 | 0 | 1 |
| i+7 | $\Delta\theta_2$ " | fB4 | 0 | X | X | 1 | 1 | 0 | 1 |
| i+8 | $\Delta\theta_1$ FOR LINE TYPE 2 | fA1 | 1 | 0 | 0 | X | X | 1 | 0 |
| i+9 | $\Delta\theta_1$ " | fA2 | 1 | 0 | 1 | X | X | 1 | 0 |
| i+10 | $\Delta\theta_1$ " | fA3 | 1 | 1 | 0 | X | X | 1 | 0 |
| i+11 | $\Delta\theta_1$ " | fA4 | 1 | 1 | 1 | X | X | 1 | 0 |
| i+12 | $\Delta\theta_2$ " | fB1 | 1 | X | X | 0 | 0 | 0 | 1 |
| i+13 | $\Delta\theta_2$ " | fB2 | 1 | X | X | 0 | 1 | 0 | 1 |
| i+14 | $\Delta\theta_2$ " | fB3 | 1 | X | X | 1 | 0 | 0 | 1 |
| i+15 | $\Delta\theta_2$ " | fB4 | 1 | X | X | 1 | 1 | 0 | 1 |

| MEMORY ADDRESS | MEMORY CONTENTS | LCW | DATA | CLOCK | $\tau$ | | |
|---|---|---|---|---|---|---|---|
| | | | | | A | B | C |
| i | T/8 FOR LINE TYPE 1 = ($\Delta \tau$) | 0 | X | C1 | X | X | X |
| i+1 | $\Delta\theta C$ FOR LINE TYPE 1 | 0 | X | C2 | X | X | X |
| i+2 | $\Delta\phi(\tau)_1$ FOR LINE TYPE 1 135° | 0 | 0 | C3 | 0 | 0 | 0 |
| i+3 | $\Delta\phi(\tau)_2$ " " " " " | 0 | 0 | C3 | 0 | 0 | 1 |
| i+9 | $\Delta\phi(\tau)_8$ FOR LINE TYPE 1 135° | 0 | 0 | C3 | 1 | 1 | 1 |
| i+10 | $\Delta\phi(\tau)_1$ " " " " 45° | 0 | 1 | C3 | 0 | 0 | 0 |
| i+11 | $\Delta\phi(\tau)_2$ " " " " " | 0 | 1 | C3 | 0 | 0 | 1 |
| i+17 | $\Delta\phi(\tau)_8$ FOR LINE TYPE 1 45° | 0 | 1 | C3 | 1 | 1 | 1 |
| i+18 | $\theta_0(\tau)_1$ FOR LINE TYPE 1 135° | 0 | 0 | C4/C5 | 0 | 0 | 0 |
| i+19 | $\theta_0(\tau)_2$ " " " " " | 0 | 0 | C4/C5 | 0 | 0 | 1 |
| i+25 | $\theta_0(\tau)_8$ FOR LINE TYPE 1 135° | 0 | 0 | C4/C5 | 1 | 1 | 1 |
| i+26 | $\theta_0(\tau)_1$ " " " " 45° | 0 | 1 | C4/C5 | 0 | 0 | 0 |
| i+27 | $\theta_0(\tau)_2$ " " " " " | 0 | 1 | C4/C5 | 0 | 0 | 1 |
| i+33 | $\theta_0(\tau)_8$ FOR LINE TYPE 1 45° | 0 | 1 | C4/C5 | 1 | 1 | 1 |
| j | T/8 FOR LINE TYPE 2 | 1 | X | C1 | X | X | X |
| j+1 | $\Delta\theta C$ FOR LINE TYPE 2 | 1 | X | C2 | X | X | X |
| j+2 | $\Delta\phi(\tau)_1$ FOR LINE TYPE 2 135° | 1 | 0 | C3 | 0 | 0 | 0 |
| j+9 | $\Delta\phi(\tau)_8$ FOR LINE TYPE 2 135° | 1 | 0 | C3 | 1 | 1 | 1 |
| j+10 | $\Delta\phi(\tau)_1$ " " " " 45° | 1 | 1 | C3 | 0 | 0 | 0 |
| j+17 | $\Delta\phi(\tau)_8$ FOR LINE TYPE 2 45° | 1 | 1 | C3 | 1 | 1 | 1 |
| j+18 | $\theta_0(\tau)_1$ " " " " 135° | 1 | 0 | C4/C5 | 0 | 0 | 0 |

FIG. 5

MULTI-LINE, MULTI-MODE MODULATOR USING BANDWIDTH REDUCTION FOR DIGITAL FSK AND DPSK MODULATION

This is a division of application Ser. No. 525,699 filed Nov. 21, 1974 and now U.S. Pat. No. 3,958,191.

FIELD OF THE INVENTION

The invention relates to modulators in general and more particularly to novel modulators which directly provide a reduced bandwidth modulated signal and to a multi-line multi-mode modulator capable of simultaneously, on a time shared basis, modulting multi-frequency, frequency shift keyed and differential phase shift keyed signals from a plurality of sources for transmission over a plurality of lines.

DESCRIPTION OF THE PRIOR ART

A technique in current use permits the digital synthesis of a sinusoidal wave by directly computing phase angle and performing a phase to amplitude translation by means of a table look-up of previously computed digital values. The digital values may then be converted to analog form by conventional digital to analog conversion techniques. This general digital technique of tore synthesis has been specifically applied to digitally implemented frequency and phase shift keyed modulators. Such a prior art frequency shift keyed modulator is illustrated in FIG. 1. In FIG. 1, a memory 11 contains two values $\Delta\theta 0$ and $\Delta\theta 1$. These digital values represent increments of phase of two waves $\sin\theta 0$ and $\sin\theta 1$ used to represent in analog form the binary 0 and 1 data. The input data is applied to a controller 12 which selects, via a switch 14, $\Delta\theta 0$ or $\Delta\theta 1$ depending on the input data applied. This is shown in FIG. 1A for a serial input data pattern of (010).

The selected value of $\Delta\theta$ is applied via a gate 15, under control of a clock 16 at a frequency $fs$, to one input of an adder 17 which adds this value to the contents of a buffer 18 which is connected to the output of adder 17. The output of adder 17 is illustrated in FIG. 1B. The output of adder 17 is applied to a read only memory 19 which accepts the digital phase of $\theta(t)$ and by table look up provides a digital amplitude signal $\sin\theta(t)$. This signal is applied to a digital to analog converter 20 which supplies a signal to a filter 21 (FIG. 1C).

The filter 21 is, of necessity, a complex filter since the signal from the modulator includes significant out of band energy introduced by the step-like frequency shifts. In addition, the characteristics of filter 21 must be modified to take into account the specific frequencies used to transmit the binary 1 and 0 values and the rate of transmission. Thus, a different filter must be provided for each type or modulator implemented. Similar digital techniques may be used for both multifrequency (MF) and differential phase shift keyed (DPSK) modulation.

A modulation technique similar to that illustrated in FIG. 1 is utilized in the time shared multiline FSK modulator disclosed in U.S. Pat. No. 3,697,892 to Lawrence et al. which provides a specific type of FSK modulation for a set of lines. The multiline time-shared modulator, however, requires separate digital to analog converters for each line and a band pass filter for each line capable of eliminating undesired out of band frequency components generated in the modulation process. Because of these requirements, the multiline modulator is incapable of handling a wide variety of modulation techniques which may be used for any of the output lines. This is so because of the specific requirements for the individual output line band pass filters. In the patented device, each output line must, of necessity, be limited to one type of modulation. If it is desired to change the modulation characteristics for a given line, it becomes necessary to alter the characteristics of the connected band pass filter. This requirement severely limits the usefulness of the multiline modulator since the lines cannot be dynamically allocated to different modulation techniques.

SUMMARY OF THE INVENTION

The invention is directed to novel digital FSK and DPSK modulators which are compatible with each other and which produce at their output modulated signals in which out of band energy is reduced thus eliminating the need of any filtering except for simple RC filters for removing quantizing noise introduced by the digital modulation used. These modulators are combined in a novel multi-line multi-mode modulator which is capable of dynamically providing a wide variety of signal modulations on a large number of lines with a substantial reduction of equipment and cost.

BRIEF DESCRIPTION OF THE DRAWINGS

FIG. 1 is a schematic diagram of a prior art digital FSK modulator;

FIGS. 1A, 1B and 1C are graphs illustrating the signals present at several points in the circuit of FIG. 1;

FIG. 3 is a table showing the relationship between the selection signals applied to the address generator of FIG. 2 and the read only memory contents;

FIGS. 4A, 4B and 4C are graphs for illustrating the operation of the modulator shown in FIG. 4;

FIG. 5 is a table showing the relationship between the selection signals applied to the address generator of FIG. 4 and the read only memory contents;

FIG. 7 is a table showing the relationship between the selection signals applied to the address generator of FIG. 6 and the read only memory contents;

DESCRIPTION OF THE PREFERRED EMBODIMENT

Figure 2:
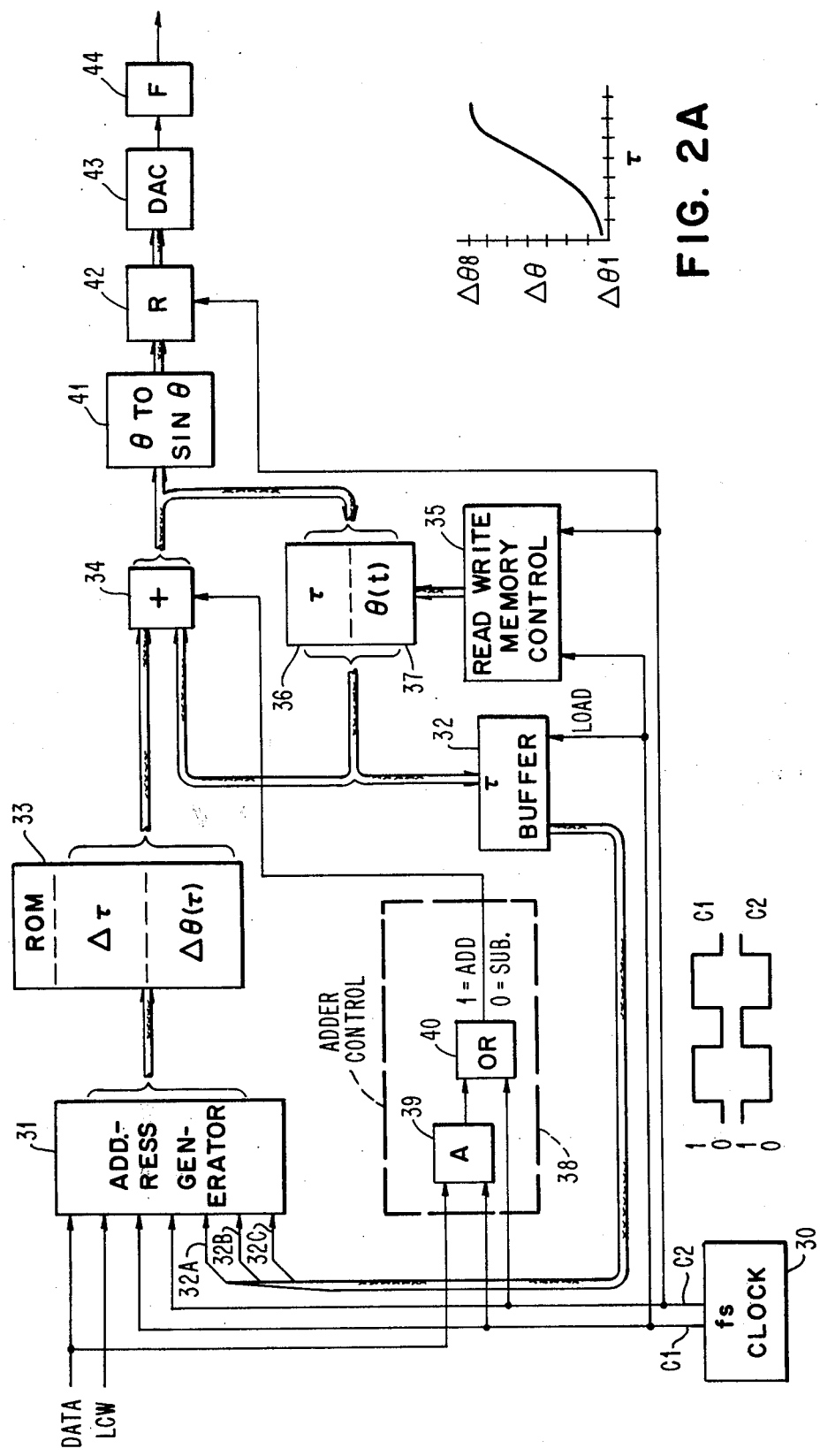
FIG. 2 is a schematic diagram of a novel FSK modulator according to the invention.

FIG. 1 described in detail above illustrates the application of digital tone synthesis techniques in an FSK modulator. A digital value of phase $\theta(t)$ is accumulated and updated each processing cycle determined by fs where fs is the sampling rate of the resulting modulated digital line signal. The amount by which the phase is incremented each sample time, $\Delta\theta$, determines the slope of $\theta(t)$ and hence the instantaneous frequency of the sine wave generated. For binary FSK, one of two values of phase increment $\Delta\theta 0$ and $\Delta\theta 1$ are selected depending on the data which is to be transmitted. The frequency of the sine wave being generated is directly proportional to the value of $\Delta\theta$. $\Delta\theta$ and $\theta(t)$ are both digital signals and the accumulation is performed with conventional arithmetic components. The digital phase signal is scaled such that arithmetic overflow of the accumulator or buffer 18 corresponds to the normal modulo 360° property of trignometric sine function.

The digital representation of phase $\theta t$ is translated to a digital representation of sin $\theta(t)$ by means of the read only memory 19. The resulting digital amplitude signal is converted to analog by conventional digital to analog conversion techniques and subsequent analog filtering. The quantizing noise resulting from the conversion from digital to analog is removed by the analog filtering along with other unwanted frequency components introduced by the modulating technique.

In the FSK modulator illustrated in FIG. 1, as well as in other conventional FSK modulators implemented with either analog or digital circuits, the instantaneous frequency of the transmitted signal is abruptly switched between two values in the course of being modulated by the input data signal. The abrupt transition in frequency causes an increase in the bandwidth of the transmitted signal over that actually required to communicate the data by the FM modulation process. When FSK data transmission over telephone channels is required, it is necessary to reduce the excessive bandwidth generated in two significant application areas. One in high speed FSK, 1200 to 1800 bits per second transmission, bandwidth reduction is necessary to comply with out of band signal regulations imposed by various regulatory agencies and two in full duplex transmission using a single physical channel, the received signal can, in many instances, be significantly smaller in amplitude than the local transmitted signal and the two frequency bands occupied by the two signals may be relatively close. This requires that the bandwidth of the transmitted signal be sharply reduced in order to prevent interference with the received signal.

Classically, FSK bandwidth reduction has been attained through band pass filtering of the transmitted signal. Some modulators have used premodulation filtering of the data signal; however, this approach has had limited application since it requires a linear FM modulator. Either of the above approaches for reducing unwanted signals introduced in the modulation process has a drawback in a digital implementation of the modulator since the arithmetic requirements of a digital filter greatly increase the functional complexity of the unit. For this reason, some digital modulators have used rather complex analog filters in their implementation.

A significant reduction in bandwidth can be achieved by eliminating the abrupt frequency transitions normally present in FSK modulation of binary data. This can be done by having the instantaneous frequency make a smooth or continuous transition in changing from one value to another. This is pointed out by Bettinger in "Digital Transmission for Mobile Radio", Electrical Communications, Vol. 47, No. 4, 1972 at page 225. Such an approach has been implemented by the use of a premodulation filter, as noted earlier, or by the application of a control signal or voltage to a linear modulator. This approach while producing a desirable result is not flexible in many uses and limits the utility of the modulator to a single band rate and set of frequencies.

In a digital FSK modulator constructed according to the invention, a smooth transition in frequency is accomplished by storing in memory digital values which represent a predetermined trajectory for the instantaneous frequency to follow and selecting these values based on the interbaud time or time since the last data transition. Such an approach is viable only in a digital FSK modulator where the phase and rate of phase change can be accurately specified. The trajectory followed as the frequency is slewed from one value to another is selected to minimize the bandwidth of the modulated signal. Both the shape and the number of intermediate points in the trajectory, per bit time, are important parameters in this regard. Analysis and experiment has shown that a sinusoidal trajectory with eight points specified in time over the data bit give the best performance in terms of minimum transmit signal bandwidth and minimum loss in receiver detectability. This does not, however, imply that an eigth point sine wave trajectory is optimum in general. When this technique is implemented as shown in the modulator illustrated in FIG. 2, out of band signaling is reduced to the point where output filtering is no longer required and the sole filtering requirement is that necessitated by the digital modulation technique employed, that is, the removal of the quantizing noise. This may be accomplished by a simple RC filter.

The modulator illustrated in FIG. 2 is capable of providing the FSK modulation for a single line of a number of different types or frequencies of FSK modulation. It requires binary input data and a line control word signal which in the illustrated embodiment is a single line designating either one type of FSK modulator or another. If the one type if designated, the line will be at a voltage level indicating the binary 0 and if the other type is indicated, the line voltage will be at a voltage indicating a binary 1. This, of course, could be expanded by providing additional lines for designating the line control word. In addition, the clock generator 30 operating at a frequency fs provides two clock phase signals C1 and C2. These are illustrated graphically in the figure and are 180° out of phase with each other. The data signals he line control word and the two clock signals are app to an address generator 31. The address generator 31 also receives signals from three conductors 32A, 32B and 32C. These 3 conductors represent the three high order bits from a buffer register 32, the function of which will be described later on. Based on the inputs described above, address generator 31 logically derives an address which is applied to a read only memory 33 to access during one-half of the clock cycle fs, a value $\Delta\tau$ and during the other half of the clock period fs, the value $\Delta\theta\tau$.

Figure 2A:
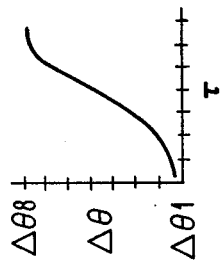
FIG. 2A is a graph for illustrating the operation of the modulator illustrated in FIG. 2.

The contents of memory 33 are set out in the table of FIG. 3. This table is divided into two sections. It shows memory address $i - i+9$ which are associated with line control word 0 for one type of FSK modulator and memory addresses $j - j+9$ which are associated with line control word 1, another type of FSK modulator. Obviously, if additional types of FSK modulators are to be implemented, additional sections of memory would be necessary as well as additional lines for the line control word to distinguish the various FSK modulators being implemented. The conditions of the selection signals are indicated in the righthand columns of the table underneath the headings "Line Control Word, Data, $\tau$, $c1$ and $c2$. During the first half of the clock cycle $fs$, that is, when $c1$ and $c2$ are 1, 0 respectively, the contents of addresses $i$ and $i+1$ or $j$ and $j+1$ depending on the line control word, will be selected if the three high order bits from buffer 32 are all zeroes or all ones and the data bit is 0 or 1, respectively, the contents from address $i+1$ or $j+1$, namely, all zeroes will be provided at the output of the read only memory during that particualr fs clock cycle. If the contents of the three high order bits and the data bits are any other value, the contents of address $i$ or $j$ depending on the line control word will be selected. In this case, this value is an increment dividing the bit period $\tau$ into eight different values to provide as shown in FIG. 2A, eight different values of $\Delta\theta$ over a single bit period for causing the frequency of the output of the modulator to change values smoothly or sinusoidally as discussed above. For example, if the sampling frequency $fs$ of 18,000 cycles per second is selected, this would yield 30 samples per bit for a 600 bit per second line. Thus, a value of 120 for $t/8$ will provide eight substantially equal steps if the three high order bits of a 12 bit position register are examined. Therefore, the numerical value 120 will be stored in binary form in memory address i to implement a FSK modulation for a 600 bit per second data rate. During the first half of each cycle $fs$, this value under the conditions described above, that is, data not zero and the three high order bits from buffer 32 not all zero or data not one and the three high order bits from buffer 32 not all ones, will be added or subtracted to modify the contents of register 36. How this is accomplished will become apparent as the description of the circuit shown in FIG. 2 continues.

During the second half cycle of clock $fs$, that is C1(0) and C2(1), the values $\Delta\theta1$ through $\Delta\theta8$ residing in address locations $i+2$ through $i+9$ will be added in a manner similar to that illustrated in FIG. 1 and described below to thus generate the actual output frequencies from the modulator. The form of the values $\Delta\theta1$ through $\Delta\theta8$ is illustrated in the graph shown in FIG. 2A. These values are selected to provide a smooth transition from the one frequency to the other.

The contents, under the conditions described above, from read only memory 33 are applied to one input of an adder circuit 34. The output of the adder circuit is selectively applied under control of clock 30 and a read write memory control circuit 35 to one of the two registers 36 and 37. During the first half of the clock period fs, the output of adder circuit 34 is inserted in register 36 under control of read write memory control circuit 35 and during the second half of the clock fs, the output of adder circuit 34 is inserted in register 37. Likewise, the contents of register 36 are added in adder 34 during the first half of the clock cycle from clock 30 with the output of read only memory 33 and during the second half cycle of clock 30, the contents of register 37 are added in adder 34 with the output from read only memory 33. The addition and readback occur under control of read write memory control circuit 35 at different portions of the output from clock circuit 30. Thus, during the first portion of each of the clock cycles, the contents of the registers 36 and 37 are added to the output of memory 33 by adder 34. After the addition takes place the sum of this addition is inserted into the registers 36 and 37. Read write memory control circuit 35 may take many forms as is well known in the prior art for controlling reading into and out of memory devices and is not shown in greater detail here since it is well known in the prior art. The contents of register 36 under control of the clock 30 C1 output are transferred to buffer 32 and the three high order bits of this register which may, for example, contain 12 bit positions are applied via conductors 32A, 32B and 32C to the address generator 31 and are used as described above for generating the address within read only memory 33 of the data which must be applied during each clock cycle to adder 34.

An adder control circuit 38 responds to the output of clock 30 and the data input to control the function of adder 34; that is, whether an addition or subtraction takes place. During the first half of the clock period of clock 30, an addition or subtraction will take place depending upon the direction of change of the data. If the data changes from a 1 value to a 0 value, the contents of register 36 must be decremented and if the data changes from a 0 to a 1, the contents of register 36 must be incremented. Adder control 38 includes an AND circuit 39 having one input connected to the data line and another input connected to the C1 output of the clock 30. The output of AND circuit 39 is connected via an OR circuit 40 to a control input of adder 34. When the data is 1 and during the first half of the clock period of clock 30, AND circuit 39 provides an output via OR circuit 40 which causes the adder to increment or add. When the data is zero, the output of AND gate 39 is down and this signal level causes adder circuit 34 to decrement. The specific implementation of this control is well known in the art and is not further described here. During the second half of clock 30, the C2 output is connected via OR circuit 40 to the control input of adder 34 and causes the adder to increment during this second half of the clock period. Buffer 32 is loaded under control of the C1 output of clock 30, thus after the contents of register 36 have been modified as described above, the new value calculated is loaded into buffer 32 where it will be available for the next cycle of clock 30 during the next sampling period.

The output of adder 34 is applied to a $\theta$ to sine $\theta$ conversion circuit 41 which may be a read only memory loaded with precomputed values of sine $\theta$ to perform the conversion. Such devices are well known in the prior art and readily available and are illustrated throughout this specification in block form only. The output of $\theta$ to sine $\theta$ converter 41 is applied to a register 42. Register 42 is strobed under control of the C2 clock from clock generator circuit 30 and the contents applied at that time to a conventional digital to analog converter 43. The output of digital to analog converter 43 pulses a simple RC filter 44 which is designed solely to remove the quantizing noise introduced by modulation process. It is obvious from the above description that the modulator may be changed from any group of frequencies to some other group of frequencies simply by changing the line control word and storing the appropriate values for that group in the read only memory 33 since the filter 44 is the same for all values, it need not be changed or switchable.

The basic processing time in FIG. 2 is divided into two parts, C1 and C2. During C1 time, a running accumulation of bit time is calculated. During C2 time, a phase accumulation is calculated as is done in the conventional digital modulator illustrated in FIG. 1, with the exception that the values of $\Delta\theta$ are selected from memory on the basis of the bit time $\tau$ from register 32. If a data transition occurs, during C1 time, numerical value which at the sampling rate will provide eight substantially equal detectably different outputs from register 32 is selected from the $\Delta\tau$ memory and added or subtracted depending on the data input. The baud time accumulation is made sharing the same adder 34 as is used for the phase accumulation. The digital value of baud time is prevented from underrunning, that is, going below the all zero state when $\Delta\tau$ is subtracted or overrunning, that is, going above the all one state when $\Delta\tau$ is added. This is accomplished by the all zero condition stored in memory location $i+1$ or $j+1$ since adding or subtracting all zeroes to any number does not change it. This memory address is selected on the basis of the conditions shown in the table of FIG. 3, namely, data 1 and $\tau$ all one or data 0 and $\tau$ all zero. In both of these conditions, an under or over run could occur. Therefore, the zero value is added to the value of $\tau$ contained in register 36 during each processing cycle. With this control, the baud time value changes from an all zero state to an all one state in eight equal steps spanning the complete bit time when the data changes from a 0 to a 1. Thereafter, the baud time remains at the all one state until the data changes back to zero. At which time, $\Delta\tau$ is subtracted and $\tau$ is permitted to increment to the all zero state.

At the end of C1 time, the highest three bits of $\tau$ are transferred to register 32 and used to address the $\Delta\theta$ memory during C2 time. The three highest bits of $\tau$ select one of the 8 values of $\Delta\theta$ to be accumulated as $\tau$ traverses from one data state to the other. As indicated in FIG. 2A, the values of $\Delta\theta$ addressed by $\tau$ produce a smooth or sinusoidal trajectory in the instantaneous frequency of the transmitted signal. The phase accumulation, phase to sine conversion, and digital to analog conversion are performed in the same manner as for the conventional modulator illustrated in FIG. 1.

Figure 4:
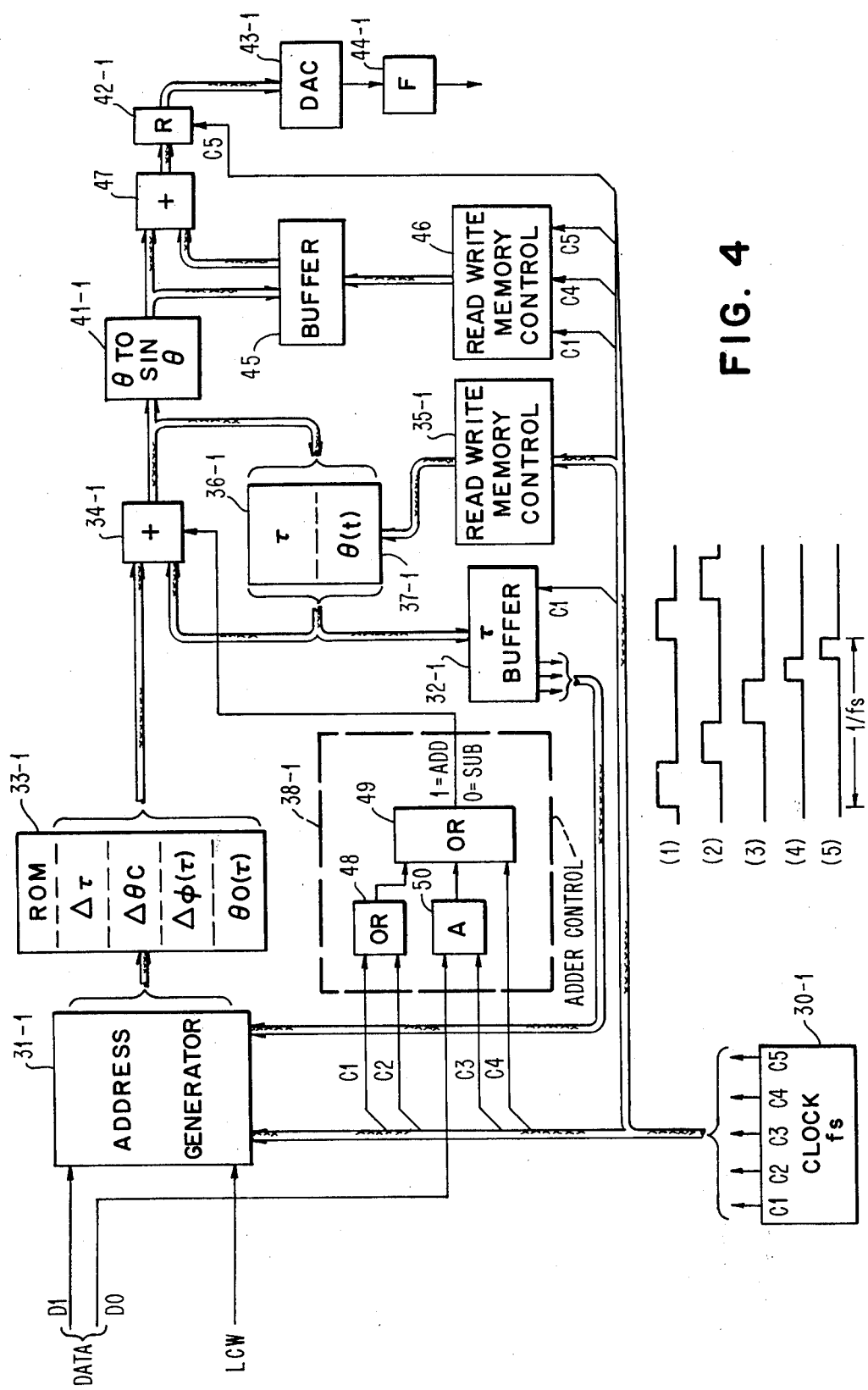
FIG. 4 is a schematic diagram of a novel DPSK modulator according to the invention.

FIG. 4 is a schematic diagram of a differential phase shift keyed modulator compatible in implementation with the FSK modulator described above with respect to FIG. 2. The implementation in FIG. 4 provides a narrow band modulation in which the generated transmit signal spectra are sufficiently narrow as not to require subsequent filtering for transmission over telephone lines or similar transmission media. The only requirement being a simple RC filter to remove the quantizing noise associated with the digital generation of the signals and conversion to analog form.

The implementation of the DPSK modulator illustrated in FIG. 4 is structurally similar to the FSK modulator illustrated in FIG. 2. Since the two modulation techniques are compatible with each other, the major differences are in the nature of the signals stored in the read only memory. In view of this similarity, the reference numerals used in FIG. 2 will be used in part in connection with the description of this figure. In the DPSK modulator, the clock 30-1 operating at a sampling frequency fs provides five outputs during each sampling time. These outputs are illustrated graphically in the figure. The first output C1 occurs during the first quarter of the period of clock 30. The second output C2 occurs during the second quarter, the third output C3 occurs during the third quarter and the fourth and fifth outputs occur during the fourth quarter. The fourth output C4 occupying the first half of the fourth quarter and the fifth output, C5, occupying the last half of the fourth quarter. The clock outputs C1-C5 are applied to the address generator 31-1 along with the three high order bits from the $\tau$ buffer 32-1. The line control word and one of the two simultaneously provided data bits for a four phase DPSK modulation. The modulation contemplated in this modulator is a conventional four-phase DPSK modulation in which two bits of a binary digital signal are simultaneously encoded. The first bit D0 defining the sign of the differential phase change and the second bit D1 defining the magnitude of the change. In this modulator, the magnitude bit is applied to address generator 31 for selecting along with the other inputs the appropriate address within the memory 33-1.

The output of address generator 31-1 selects an address during each of the five processing cycles of clock period 30-1 and reads the data stored in that address from the read only memory 33-1. This data is applied to one input of an adder 34-1. Two feedback register 36-1 and 37-1 similar to the registers 36 and 37 of FIG. 2 are connected from the output of the adder 34-1 to the other input of the adder 34-1 and selectively entered therein by the clock signals from clock generator 30-1 which are applied to a read write control circuit 35-1. The contents of register 36-1 are applied to adder 34-1 during clock time C1 and added to the contents supplied from read only memory 33-1 then reinserted into register 36-1. At the end of this clock period, the contents of register 36-1 are also inserted into buffer 32-1 and are used as previously described for generating the address in address generator 31-1 along with the other inputs applied thereto. How these particular inputs access specific data in the memory will be described later in connection with the description of FIG. 5 which includes a table of the memory and the selection signals.

During the second clock period, C2, the contents of register 37-1 are added to the data supplied from read only memory 33-1 and then reinserted in the register 37-1. This step is repeated during the third clock period C3. During clock period C3, the adder 34-1 will either add or subtract depending upon the sign of the D0 data bit applied to the adder control circuit 38-1. If the sign bit is negative, adder control circuit 38-1 will provide an appropriate signal to adder 34-1 causing a subtraction to take place. If the sign bit is positive, an addition will take place. The arrangement of adder control circuit 38-1 will be described below.

During the fourth clock period C4, the contents of register 37-1 are added to the signal supplied by the read only memory 33-1, passed through $\theta$ to sin $\theta$ conversion read only memory 41-1 and inserted in a buffer 45 which is under control of a read-write and clear control circuit 46. Circuit 46 responds to clock pulses C4, C5 and C1. During clock pulse C4 the output from $\theta$ to sin $\theta$ conversion circuit 41-1 is inserted into buffer 45. The contents of register 37-1 are not altered at this time. That is, the summation during the fourth clock period C4 does not alter the contents of buffer 37-1. This is effected by read/write control circuit 35-1 in response to the C4 clock pulse. During the fifth clock pulse C5, the signals supplied from read only memory 33-1 are subtracted from the contents of register 37-1 under control of circuit 38-1. The output of adder 34-1 is passed through $\theta$ to sin $\theta$ conversion circuit 41-1 and applied to one input of an adder 47. The other input of adder 47 is connected to buffer 45 which during clock time C5 is read into the other input of adder 47 under control of read/write and clear circuit 46. The output of adder 47 is inserted in register 42-1 which at the trailing edge of clock time C5 is applied to a digital to analog converter 43-1 which has its output connected to filter 44-1.

Adder control circuit 38-1 is provided with an OR gate 48 having two inputs connected to the C1 and C2 outputs of clock generator 30-1. The output of OR gate 48 is connected to one input of another OR gate 49 which has its output connected to the control input of adder 34-1. When this output is in a 1 state, that is when either clock pulse C1 or C2 are present, adder 34-1 will add the contents applied at its two inputs. When the output of OR circuit 49 is 0, the contents applied to the two inputs will be subtracted. An AND gate 50 has one input connected to the D0 data bit line and a second input connected to the C3 clock output of clock generator 30-1. When the data bit D0 is 1, during clock period C3, AND gate 50 provides an output which is applied via OR circuit 49 to cause adder 34-1 to assume the adding mode, if the data bit is 0 indicating the negative sign, the adder will be controlled to perform a subtraction. A third input to OR circuit 49 is connected to the C4 output of clock generator 30-1 and causes an addition to occur during the C4 clock time. Summarizing adder 34-1 under control of adder control circuit 38-1 performs an addition during C1, C2, and C4 times regardless of the circumstances. During C3 time it performs an addition, when the D0 bit is positive and a subtraction when the D0 bit is negative. During C5 time, a subtraction is always performed.

The modulator of FIG. 4 is specifically configured to perform the function of a four-phase modulator such as the IBM 3872 and the Bell 201 modems and is based on encoding two bits of data per baud by the differential phase between bauds as indicated in the table below.

| D0 | D1 | Phase Differential |
|----|----|-------------------|
| 1  | 1  | +45               |
| 1  | 0  | +135              |
| 0  | 1  | −45               |
| 0  | 0  | −135              |

As with the FSK modulation previously described, abrupt transitions in phase between bauds in DPSK modulation produce modulated output signals containing excessive out of band frequencies. A significant reduction in the bandwidth of the output signal can be achieved by having the $\Delta\theta$ increments between the bauds vary in a smooth manner. Additional reductions in bandwidth can be obtained by combining amplitude modulation with the phase modulation. The above attributes are obtained through a widely used approach which employs a modulated signal consisting of using two phase modulated carriers, each with envelope modulation. Abrupt phase changes are made when the envelope of the particular carrier is zero The equivalent modulated signal has a smooth phase transition and can be written with the following form.

$$L(t) = E(\tau) \cos [wct + \theta m + \phi (\tau)]$$

where
  $Wc$ = carrier frequency
  $\theta m$ = arbitrary phase angle (not significant since the modulation is on a differential phase)
  $E(\tau)$ = envelope or amplitude function
and $\phi(\tau)$ = Phasing function which describes the phase change between bauds.

The direct but straightforward approach to implementing the above line signal requires a digital multiplier to accomplish the amplitude modulation. Such an approach would significantly increase the complexity of the transmitter. Multiplication is avoided by taking advantage of the ability to accurately control phase angle within the transmitter signal flow. The technique used is described below. Let $$L(t) = E(\tau) \cos [\theta(t)]$$

where $\theta(t) = Wct + \theta m + \phi(\tau)$ and assume $E(\tau)$ is scaled to a maximum level of 1, then $E(\tau) \cos \theta(t) = 1/2 \cos [\theta(t)+\cos^{-1}E(\tau)]+\cos[\theta(t)-\cos^{-1}E(\tau)]$ or $L(t) = \cos [\theta(t) + \theta 0(\tau)] + \cos [\theta(t) - \theta 0(\tau)]$ where $\theta 0(\tau)$ is an offset angle equal to $\cos^{-1}[½E(\tau)]$ Amplitude modulation is accomplished by generating two phase modulated sinusoids properly displaced in phase by 2 $\theta 0(\tau)$ and transmitting their vector sum as described above in connection with the FIG. 4. The processing period as described for the line is segmented into five parts. During the first part, C1, a running accumulation of interband time $\tau$ is made. This is similar to the accumulation performed with respect to the FSK modulator described above. However, in the case of DPSK modulation, $\tau$ can be allowed to overflow since a phase change is made in each baud time. As in the case of FSK, the three most significant bits of $\tau$ are used. Thus, $E(\tau)$ and $\phi(\tau)$ are each defined by eight discrete values per baud. See the graphs in FIGS. 4A, B and C.

During the second time periods, C2 of the processing cycle $\theta(t)$ is incremented by an amount $\Delta\theta c$ which corresponds to that part of the phase accumulation due to the carrier frequency Wct. During the third processing time period, C3, $\theta(t)$ is changed by an amount $\Delta\phi(\tau)$ which generates the smooth transition $\phi(\tau)$ in phase change over the baud time. Again, this may be seen from the graphs in FIGS. 4A–C. $\Delta\phi(\tau)$ is determined by $\tau$ and the magnitude of the phase change to be made which is determined by the D1 data bit. The sign of $\Delta\phi(\tau)$ is determined by the D0 data bit which controls the sign of the adder via the adder control circuit 38-1. During the fourth and fifth processing times of each cycle, the offset angle $\theta 0(\tau)$ is selected from memory. The particular value selected is determined by the value of $\tau$ and the magnitude of the phase change by the data bit D1. The magnitude of $\theta 0(\tau)$ is independent of the sign of the change. During the fourth C4 time, the sum $\theta(t) + \theta 0(\tau)$ is calculated and converted to an amplitude value which is placed in buffer 45. During the fifth time period, C5, $\theta(t) - \theta 0(\tau)$ is calculated and converted to an amplitude value and added to the contents of buffer 45 in adder circuit 47, to thus produce the composite modulated signal at the end of C5 time. The output of adder 47 is inserted in the register 42-1 and gated to the digital to analog converter 43-1 at the appropriate time by the trailing edge of the C5 clock pulse from clock generator 30-1. The output of the digital analog converter 43-1 pulses filter 44-1 to provide the signal on the line. The filter, a simple RC filter, removes the quantizing noise introduced by the digital generation process.

The memory contents for read only memory 33-1 are illustrated in FIG. 5. A single bit line control word which may assume two states, 0 and 1. Two sets of values are stored. Each occupy 44 addresses in the memory. The first set $i$–$i+33$ are associated with modulation type $LCW = 0$. The selection process or logic required in the address generator 31-1 for each of the addresses and the data input supplied thereto are illustrated in the table alongside each of the address locations.

Address i includes a value T/8 which for the sampling frequency selected will when successively added to the contents in buffer 32-1, reduce thee substantially equally spaced detectable outputs from buffer 32-1 which are applied to the address generator 31-1 during a single baud time. The contents of address i are obtained during the clock time C1 of each sampling cycle. The data content of the D1 bit and the values from the $\tau$ buffer 32-1 have no consequence. Thus, during each baud time register 36-1 counts up by the predetermined value T/8 which is selected based on the baud rate of the information and the sampling frequency $fs$ by 8 detectably different outputs in the three high order bits of the $\tau$ buffer 32-1 substantially equally spaced across the baud time. Address $i+1$ contains a value $\Delta\theta c$ which in the circuit disclosed in FIG. 4 produces the carrier frequency when incrementally added in the $\theta(t)$ register 37-1. This particular quantity is provided during the second or C2 clock time and the value again of $\tau$ and the value of the D1 bit are immaterial. The value selected for $\Delta\theta c$ is dependent upon the carrier frequency of the modulation.

The contents of memory addresses [$i+2$ through $i+9$ contain the $\Delta\theta(\tau)$'s necessary to provide a smooth transition in eight successive steps where the phase is to be advanced or retarded by 135° as determined by D0 for the selected baud rate and carrier frequency defined by line control word zero. The particular value selected from these addresses is determined by the three high order bits from the $\tau$ buffer 32-1. These are illustrated in the table. One of these values is selected during the third clock time of each sampling period C-3, depending upon the value of the $\tau$ buffer 32-1. Addresses $i+10$ through $i+17$ contain similar values for $\Delta\theta(\tau)$ for a smooth transition of + or −45° and are selected on the same basis and during the same clocking period as addresses $i+2$ through $i+9$. These values are selected if the D1 bit is a 1 instead of a 0.

As previously stated, the values of $\theta 0(\tau)$ are the same during the fourth and fifth cycles, therefore a single set of values for $\theta 0(\tau)$ is provided in address $i+18$ through $i+25$ for a phase change of 135° and another set of values for $\theta 0(\tau)$ is provided in address $i+26$ through $i+33$ for a phase change of 45° depending upon the status of bit D1. One or the other of these groups of values for $\theta 0(\tau)$ is selected during the C4 and C5 processing periods. The particular one selected from each of the groups is determined by the value of $\tau$ buffer 32-1. More specifically, the three high order bits contained in the buffer. During the C4 period the value read from memory 33-1 is added to the contents of register 37-1 and stored in buffer 45 after being converted in $\theta$ to sin $\theta$ conversion circuit 41-1, and during the C5 processing period, the value of $\theta 0(\tau)$ read from memory 33-1 is subtracted from the contents of register 37-1, converted in a $\theta$ to sine $\theta$ conversion circuit 41-1 and at that time added to the contents previously stored in buffer 45 in the adder 47.

The memory includes another set of addresses $j$ through $j+33$ for a second type of DPSK modulator identified by line control word one. These values are similar to the values described above in addresses $i$ through $i+33$, however, the particular values stored will depend upon the carrier frequency and the baud rate for the modulator. If additional modulation frequencies and baud rates are to be implemented, additional blocks of memory addresses will be required and the line control word will have to be expanded to uniquely identify which is to be selected by the address generator 31-1. While the modulation process has been described in terms of 4-phase modulation, it is extendable to higher levels of phase modulation such as 8-phase by providing suitable functions for $\Delta\phi(\tau)$ and $\theta 0(\tau)$ as will be well understood by those skilled in the art.

In some instances such as where low baud rates are used or where less stringent out of baud signal reduction requirements are stipulated, the amplitude modulation described and illustrated may be eliminated. This may be accomplished by eliminating the processing steps performed during the c4 and c5 clock times. In this event, the circuit components following $\theta$/sin $\theta$ conversion circuit 41-1 would be identical to those following the corresponding circuit 41 in FIG. 2.

In addition, the circuit illustrated in FIG. 4 and described above may be used to perform an amplitude modulation only. This may be accomplished by eliminating the processing step which occurs in the $c3$ clock time. This would eliminate the addition of the phase components $\Delta\phi(\tau)$. In this instance, no structural changes are required except for the elimination or suppression of the $c3$ clock time and processing steps which occur therein.

Figure 6:
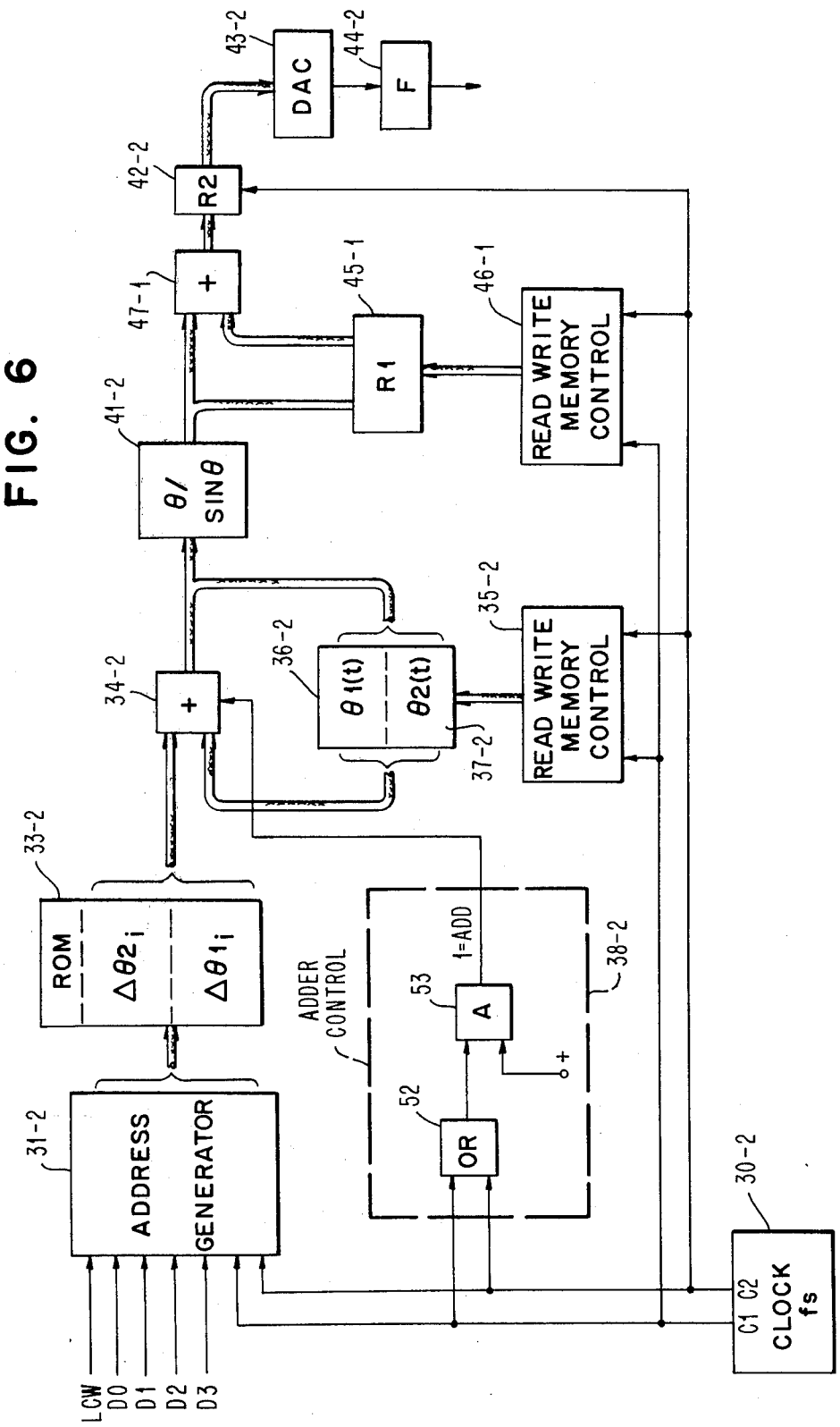
FIG. 6 is a schematic diagram of a multifrequency modulator constructed in accordance with the prior art.

The modulator illustrated in FIG. 6 is specifically arranged to perform a multifrequency modulation similar to what is commonly known as touchtone signalling. In this form of signalling, pairs of selected frequencies are simultaneously transmitted to convey information. If four A and four B frequencies are available, and one A and one B frequency are simultaneously transmitted, sixteen different paired frequency combinations are available for transmitting data. These may typically transmit ten numeric digits and six control characters.

The modulator has the same general format as modulators previously desecribed. Four parallel data bits are required to identify two tones, one of which is selected from a group of four and the other of which is selected from another group of four. These are indicated in the drawing as D0 through D3 and are applied directly to the address generator 31-2. A clock generator 30-2 provides a sampling frequency fs having two phases C1, C2. The C1 phase occupies the first half of the clock period and the C2 phase occupies the second half of the period of clock 30-2. Both of these signals are applied to address generator 31-2 which based on the input signals generates an address for accessing phase information stored in a read only memory 33-2. Read only memory 33-2 includes two sets of values $\Delta\theta 1$ and $\Delta\theta 2$ which are the increments of phase and are similar to those described in the previous modulators. The value $\Delta\theta$ selected thus determines the frequency of the tone which will be generated by the modulator.

The contents of read only memory 33-2 are illustrated in tabular form in FIG. 7. In address locations $i$ through $i+15$, the selection signals include the line control word, data bits D0 through D3, and the two clock phases C1 and C2. The eight addresses $i$ through $i+7$ are associated with one of A and B frequencies each including four different frequencies and the addresses $i+8$ through $i+15$ are associated with another set. These sets are identified by the line control word being zero or one. The data bits D0 and D1 define the A frequency which must be generated. The generation of the A frequency occurs during the first half of the clock period indicated by C1 being in a positive state and C0 in a negative state. The generation of the B frequency is accomplished during the second half of the clock period. This may be seen in the table.

The particular configuration of the D0 and D1 bits selects one of four values of $\Delta\theta1$ and the configuration of the D2 and D3 bits selects one of four values of $\Delta\theta2$, selections being made from addresses $i$ through $i+7$ on the basis of the line control word and from the $\Delta\theta1$ group on the basis of the C1 clock pulse and from the $\Delta\theta2$ group on the basis of the C2 clock pulse. As previously stated, the nature of the data stored and the location $i+8$ through $i+15$ is similar differing only in the values stored. The selection signals except for the line control word are substantially similar.

The contents of the read only memory 33-2 accessed by the output of address generatore 31-2 are applied to one input of an adder circuit 34-2. The adder circuit 34-2 in this modulator is always operated in the add mode and the adder control circuit 38-2 produces this result since the two clock pulses are applied to an OR circuit 52 which has its output connected to one of two inputs of an AND circuit 53. The other input of the AND circuit is connected to a positive source of voltage and provides one level at all times since the clock pulses C1 and C2 are positive in alternate half-cycles of the clock generator 30-2. The other control circuit 38-2 was inserted primarily to indicate the compatibility with the other modulator forms disclosed and described above.

The output of adder 34-2 is selectively applied to one of two registers 36-2 or 37-2 under control of a read/write control circuit 35-2 which responds to clock pulses C1 and C2. When clock pulse C1 is received, register 36-2 is connected to the output of adder circuit 34-2 and when clock pulse C2 is received, register 37-2 is connected to the output of adder circuit 34-2. The outputs of registers 36-2 and 37-2 are connected to the other input of adder circuit 34-2 and are controlled by read/write control circuit 35-2 in the same manner as the input from adder 34-2. Thus, during the first clock cycle, $\Delta\theta1$ selected by the inputs previously described is added to the contents of register 36-2 and reinserted in register 36-2. During the second half-cycle of the clock period, $\Delta\theta2$ as previously described, is added to the contents of register 37-2.

The output of adder 34-2 is applied to a $\theta$ to sine $\theta$ conversion circuit 41-2 identical to the circuits previously described. The output of the conversion circuit is connected to a register 45-1 which is under control of a read/write control circuit 46-1 which responds to clock pulses C1 and C2. During clock pulse C1, the output of the converter circuit 41-2 is inserted in register 45-1. During clock pulse C2, the contents previously stored in register 45-1 is applied to one input of an adder circuit 47-1. The other input of adder circuit 47-1 is connected to converter 41-2 and forms the sum of the two values applied to the two inputs. The output of adder 47-1 is connected to another register 42-2 which is gated at the trailing edge of clock pulse C2 to a digital to analog converter 43-2 which has its output connected to a simple RC filter 44-2.

The modulator described above in FIG. 6 is useful for multifrequency or parallel tone generation which may be applicable for data transmission or auto dialing. These applications use sufficiently low baud rates as not to require the bandwidth reduction techniques used in the two previously described modulators. If higher baud rates are required, the technique described in connection with FIG. 2 may be used. One of four tones are generated from each of two bands depending on a baud of data consisting of four bits. The processing period is divided into two segments C1 and C2. During the C1 segment, bits D0 and D1 select one of four values of $\Delta\theta$ from the memory, the value of $\Delta\theta$ determines the frequency of the tone which will be generated. The value of tone 1, $\theta1(t)$ stored in register 36-2, is incremented during each C1 time and converted to an amplitude value sin $\theta1(t)$ and placed in the buffer register 45-1. During C2 time, the phase of the second tone, $\theta2(t)$ is incremented by a value $\Delta\theta$ determined by input bits D2 and D3. The amplitude of the second tone sin $\theta2(t)$ stored in register 37-2 is added to the contents of buffer register 45-1 to produce the next two tone transmitted signal at the end of C2 time.

Figure 8:
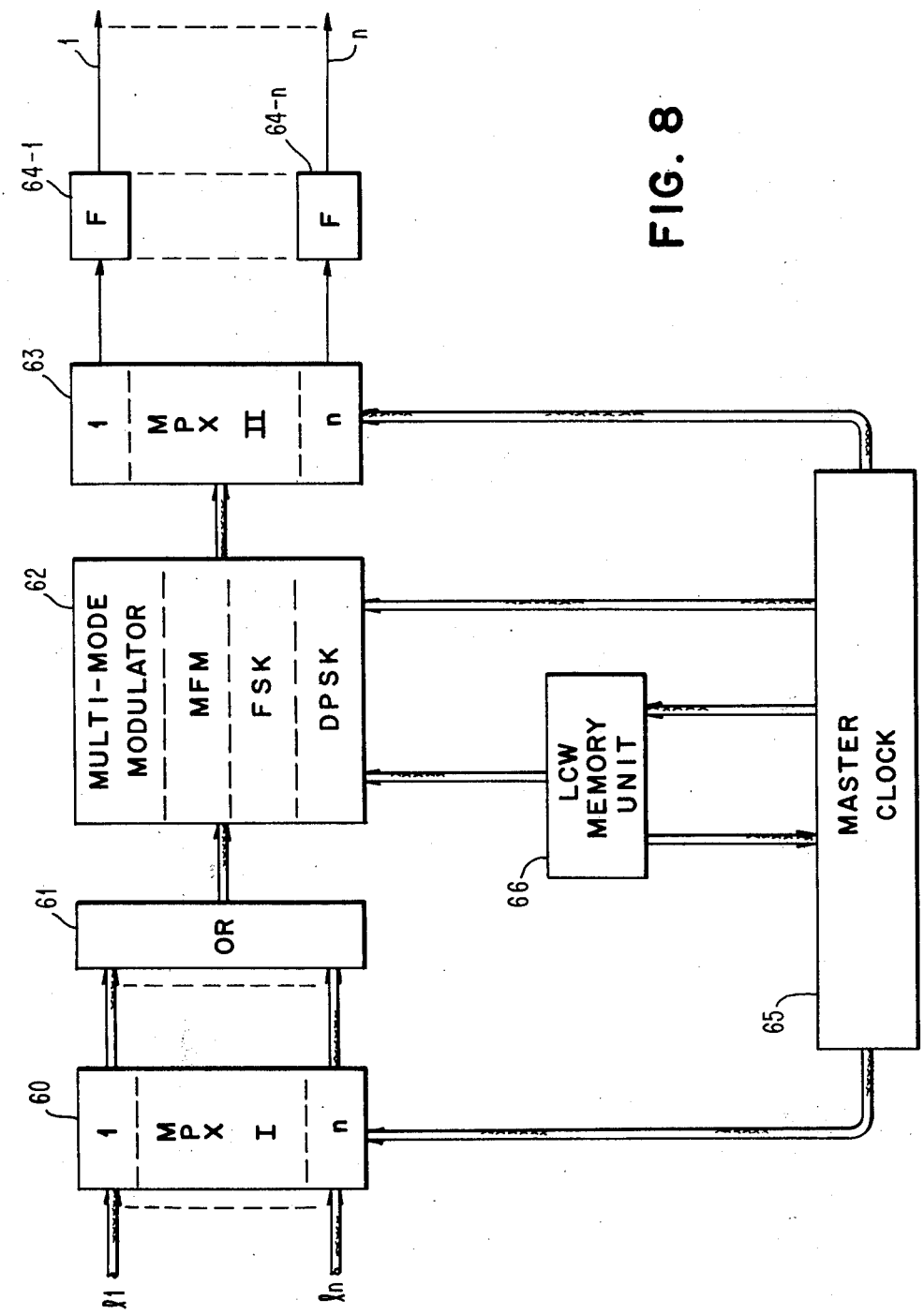
FIG. 8 is a block diagram of a novel multiline multi-mode modulator constructed in accordance with the invention.

FIG. 8 discloses an overall block diagram for a multiline multimode modulator which is capable of servicing $n$ input and $n$ output lines substantially simultaneously by a time sharing technique of the modulator. The modulator is capable of providing different varieties fo three major types of modulations for any mix of the $n$ lines. The modulation types provided are multifrequency, frequency shift keyed and differential phase shift key modulation. A number of different varieties of each of the types of modulators may be implemented as will become apparent as the description continues.

The multiline multimode modulator includes an input multiplexer 60 connected to $n$ multiwire input lines or cables L1 through L$n$. The multiplexer outputs are connected via an OR circuit 61 to a multimode modulator 62 where the signals from each of the $n$ lines are sequentially modulated as required for the particular line. The modulated signals from the multimode modulator 62 are applied to a second multiplexer 63 which distributes the modulated signals to the appropriate output lines 1-$n$ via individual RC filters 64-1 through 64-$n$. Filters 64-1 through 64-$n$ are identical and each are simple RC filters whose sole function is to remove the quantizing noise from the digital to analog conversion process. A master clock circuit 65 provides control signals to multiplixers 60 and 63 as well as to the multimode modulator 62. In addition, master clock circuit 65 provides control signals to a line control word memory unit 66 which provides signals to the multimode modulator 62 and the master clock circuit 65. Multiplexers 60 and 63 operate in synchronism under control of master clock circuit 65, thus input lines 1-n are sequentially connected through the multimode modulator 62 to output lines 1-$n$, respectively. The line control word memory unit 66 includes $n$ addresses each identified with one of the input lines L1-$n$ and in which is stored a line control word identifying the precise modulation required for that line. That is, which type of modulator it is and which variety of modulator of that type is being serviced for that line at that time. The line control words may be changed as requirements for modulation for any line are changed. This may be done manually or automatically as will become apparent as the description continues.

Figure 9:
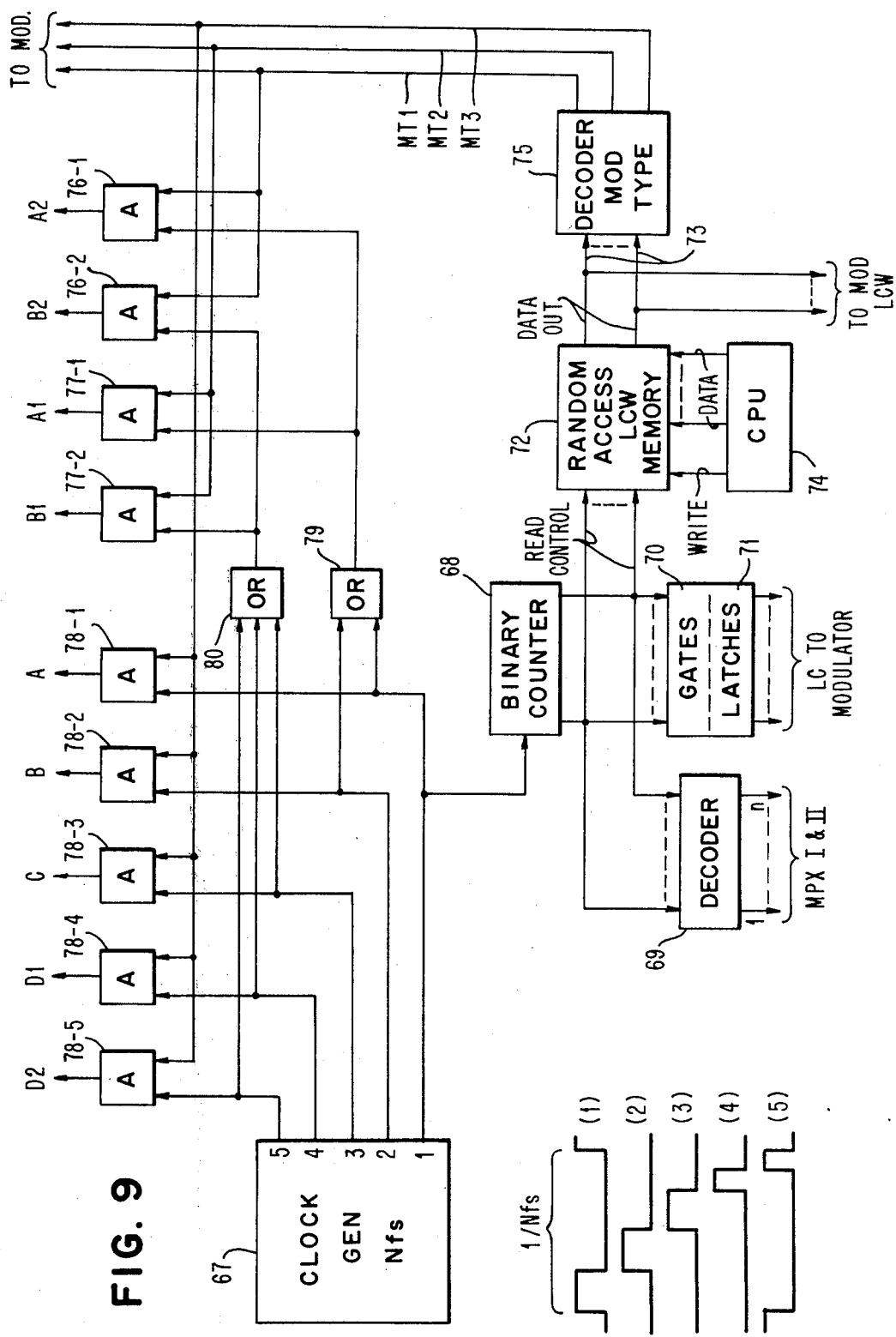
FIG. 9 is a schematic diagram, in greater detail, of the clock and line control word memory unit illustrated in FIG. 8.

The master clock 65 and the line control memory unit 66 are illustrated in detail in FIG. 9 since these units provide all of the control signals for the multiplexers 60 and 63 and the multimode modulator 62.

A clock generator 67 operates at a frequency nfs where fs is the sampling frequency per line and n is the number of lines which must be sampled. Except for the actual frequency utilized, this clock is similar to clock 30-1 of FIG. 4 and provides during each clock period, five outputs illustrated below the clock in graphic form. The first output is positive during the first quarter of the period and negative during the remainder of the period. The second output is positive only during the second quarter of the period. The third output is positive only during the third quarter of the period. The fourth and fifth outputs are positive during the first and second halves of the fourth quarter, respectively. The one output from clock generator 67 is applied to a binary counter 68 which is arranged to count as high as n and recycle thus incrementing one count during each period of clock generator 67. The outputs of binary counter 68 are applied to a decoder circuit 69 which provides the enabling outputs for operating multiplexers 60 and 63 since the outputs of decoder 69 sequentially identify one of the n lines. The outputs of binary counter 68 are also applied via gate circuits 70 to latches 71 to provide a binary output identifying the lines. The outputs of latches 71 are applied directly to the multimode modulator 62 and the use of this output will be described later.

In additon, the outputs of binary counter 68 are utilized as addresses for accessing the random access line control word memory 72. Thus, each time binary counter 68 increments to a new value, a new word is read out of random access line control word memory 72 and provided on the data output bus 72. Random access line control word memory 72 is also provided with a data input bus and write control circuits whereby line control words may be inserted into the random access memory as needed or desired from some external source such as a computer 74 illustrated in the drawings. Typically, computer 74 may also be the source of the data which is being transmitted over lines L1 through Ln. Alternatively, the line control words may be inserted from a locally associated terminal connected to the data bus and the write control circuits and need only supply the address location and the data to be stored therein.

The data output on bus 73 from random access line control word memory 72 is applied to a decoder circuit 75 which provides one of three outputs identifying the modulation type. The outputs are labeled MT1, MT2 and MT3. The outputs of MT1-MT3 are applied to the multimode modulator 62 as will be apparent in connection with the description of FIG. 10. The data output bus 73 is also applied to the multimode modulator 62 and the use of these signals will be described in connection with the description of FIG. 10.

Figure 10:
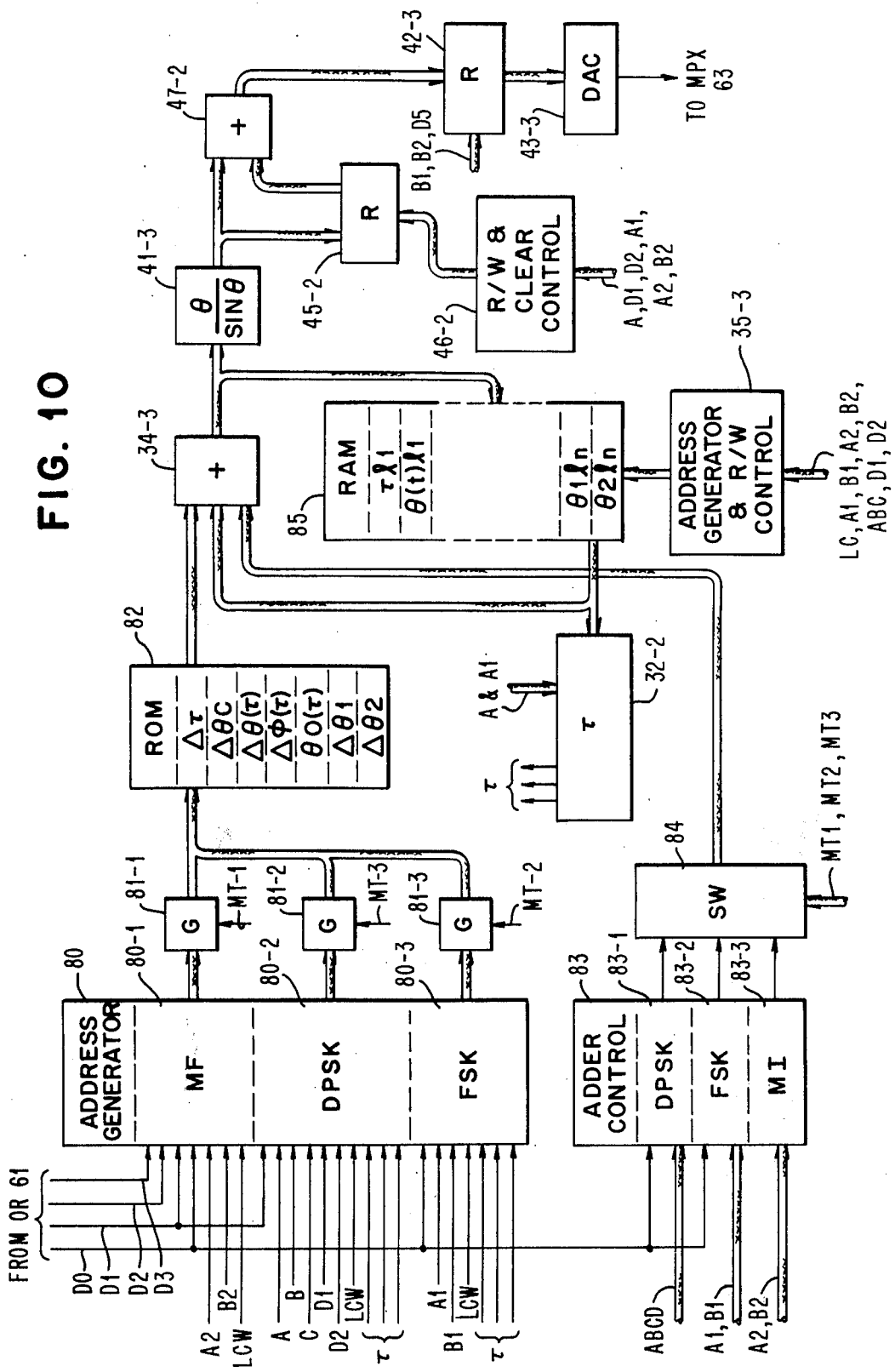
FIG. 10 is a schematic block diagram of the novel modulator illustrated in FIG. 8.

The MT1 output from decoder 75 is connected to two AND gates 76-1 and 76-2. The output MT2 is connected to two AND gates 77-1 and 77-2 and the output MT3 is connected to five AND gates 78-1 through 78-5. Gates 78-1 through 78-5 are connected to outputs 1-5 respectively from clock generator 67 and provide five sequential outputs when the line control word decoded indicates a differential phase shift keyed modulation function must take place for that line. The outputs of the gate 78-1 through 78-5 for convenience have been labeled A, B, C, D1 and D2, respectively. These pulses in the description which follows will be considered clock pulses appearing during a single sampling period for processing purposes in the circuit of FIG. 10 which is a detailed block diagram of the multimode modulator 62. These signals are applied to the modulator 62 as seen in FIG. 10 in the places indicated by the above alphabetic labels. Outputs 1 and 2 of clock generator 67 are connected to an OR circuit 79 which has its output connected to AND gates 67-1 and 77-1. Outputs 3, 4 and 5 from clock generator 67 are connected to OR circuit 80 which has its output connected to AND gates 76-2 and 77-2. AND gates 77-1 and 77-2 provide outputs A1 and B1 respectively when the modulation required is FSK while AND gates 76-1 and 76-2 provide outputs A2 and B2 when the modulation required is multifrequency. The timings provided by the signals from these AND gates may be determined from the graphs shown below clock generator 67.

Clocks A1 and B1 occupy the first and second halves of a sampling period, and are active during a FSK modulation. Clocks A2 and B2 occupy the first and second halves of a sampling period and are provided when a multi-frequency modulation takes place for a given line. Clocks A, B, C, D1, and D2 are provided when a DPSK modulation is taking place for a given line and are identical in timing during a single clock period as shown in the graphs below clock generator 67.

The multimode modulator illustrated in FIG. 10 is similar in many respects to the DPSK modulator illustrated in FIG. 4. However, it utilizes three separate address generators, each similar to those previously described and three adder control circuits similar to those previously described and selection gates under control of the signals MT1 through MT3 illustrated in FIG. 9 and previously described.

A three section address generator 80 having a first section 80-1 for generating addresses based on the input data for the selection of signals from the memory suitable for producing multifrequency tone pairs; a section 80-2 for generating addresses suitable for the selection of data for generating differential phase shift keyed signals; and a section 80-3 suitable for generating addresses for accessing data suitable for generating frequency shift keyed signals is connected to the output as indicated of OR circuit 61 which provides up to four data lines in parallel. The sections are also connected to the A1, B1, A2, B2, A, B, C, D1 and D2 clock signals from the master clock 65; to the line control words from the data output bus 73 of random access line control word memory 72; and to a τ register 32-2 similar to the τ registers previously described in connecton with the description of FIGS. 2 and 4 and which will be described in detail below. Section 80-1 may be identical to the address generator 31-2 illustrated in FIG. 6. Section 80-2 may be identical to the address generator 31-1 illustrated in FIG. 4 and section 80-3 may be identical to the address generator 31 illustrated in FIG. 2. The outputs of sections 80-1 through 80-3 are connected by gates 81-1 through 81-3 to the control input of a read only memory 82 which contains all the information in read only memories 33, 33-1 and 33-2 of FIGS. 2, 4 and 6, respectively.

The three section adder control circuit 83 provides adder control for each of the three modulation modes, and includes a first section 83-1 for providing the adder control function for differential phase shift keyed modulation, a second section 83-2 for providing adder control for frequency shift keyed modulation and a third section 83-3 for performing adder control for multifrequency modulation. The inputs to each of these sections are identical to the corresponding adder control circuits shown in FIGS. 2, 4 and 6. Each of the sections is connected by a switch 84 under control of the MT1 through MT3 outputs from decoder 75 to the control input of an adder 34-3 which is similar to adders 34-1 through 34-2 shown in the previous figures.

The output of read only memory 82 is connected to one of the inputs of adder 34-3. The output of adder 34-3 is connected to the data input bus of a random access memory 85 and the output bus of random access memory 85 is connected to the other input of adder 34 and to a $\tau$ buffer 32-2 similar to the $\tau$ buffers 32 and 32-1 shown in FIGS. 2 and 4, respectively. Random access memory 85 contains two address locations for each of the $n$ lines serviced by the multiline, multifrequency modulator. Which of these addresses is selected is controlled by an address generator and read/write control circuit 35-3 which responds to the LC output from latches 71 and the clock signals A1, B1, A2, B2, A, B, C, D1 and D2 from master clock circuit 65.

For example, if the multiline, multimode modulator is serving four lines, the output of binary counter 68 will be provided on two lines which may be 00, 10, 01 and 11 depending upon which line is being serviced. These two lines may be used as the high order bits of the address in random access memory 85. The low order bit for the address will be selected as a function of the clock signals, A1, A2, and A indicating a 0 low order bit and the other clock pulses indicating a 1 low order bit. During clock times D1 and D2, a read operation only takes place. The output of random access memory 85 in addition to being connected to the other input of adder circuit 34-3 is connected to a $\tau$ buffer 32-2 which is loaded during the A and A1 clock pulse times. The three high order bits from buffer 32-2 are applied to address generators 80-2 and 80-3 and perform the same functions in these address generator sections as the y performed in the single line versions described in FIGS. 2 and 4. The output of adder 34-3 is applied to a $\theta/\sin \theta$ conversion circuit 41-3 similar to all of the previously described $\theta/\sin\theta$ conversion circuits. The remainder of the circuit is functionally similar to that of FIG. 4 and includes a register 45-2 connected to the output of $\theta/\sin \theta$ conversion circuit 41-3 for receiving the output therefrom under control of a read/write and clear circuit 46-2 and supplying an input to a second adder circuit 47-2 which is also connected to the output of circuit 41-3. A register 42-3 is connected to adder 47-2 and supplies when gated a digital to analog converter circuit 43-3. Read/write and clear control circuit 46-2 is responsive to clock pulses A, A1, A2, B2, D1 and D2. During clock pulses A and A1, the register is cleared to thus cause adder circuit 47-2 to directly pass the output of conversion circuit 41-3 to the register 42-3 without alteration since in these instances, the function performed by the adder circuit 47-2 where they are added to the then available contents from conversion circuit 41-3. The output from digital to analog converter circuit 43-3 is applied to the input of multiplexer 63 illustrated in FIG. 8 and under control of the master clock signals from clock 65, it is distributed to the appropriate output line 1-$n$ via the simple RC filters 64-1 through 64-$n$.

The three major modulation techniques implemented in FIG. 10 are identical to the three modulation techniques illustrated and described with respect to FIGS. 2, 4 and 6. The only difference being that the address generator for accessing read only memory 82 is expanded to encompass all of the various modulation types, the clock is expanded to provide each of the clocking signals, the adder control circuit 83 is expanded to provide the three different types of addition control previously described and the switch 84 is provided to connect the appropriate adder control signals as indicated by the signals from the master clock 65. The only other addition is the expansion of random access memory 85 to include two address positions for each of the lines handled by the multiline, multimode modulator. Since only two address positions are required for each line, random access memory 85 is generally purpose and the only signals needed to select the appropriate addresses are those signals from master clock 65 which identify the line currently being serviced and those clocking signals necessary to control the function of the memory 85. The remaining circuits are, as previously stated, identical to those of FIGS. 4 and 6. Insofar as the modulation technique described in FIG. 2 is concerned, the adder 47-2 and the register 45-2 and control 45-2 are superfluous and the reason for providing the reset signal as stated above, is to remove these circuits in those instances where the frequency shift key modulation is being implemented. Since in those instances, zero is inserted in the register 45-2 and an addition of zero to the digital signals provided by the converter circuit 45-3 passes those signals on through to register 42-3 unchanged.

It is obvious that this circuit provides substantial savings in cost since expanding it to 16 or more lines merely required minor additions to the read/only memory 82 to store the factors of the different types of modulation required and the expansion of the random access memory 85 to include two registers for each of the lines serviced.

While the invention has been particularly shown and described with reference to preferred embodiments thereof, it will be understood by those skilled in the art that various changes in form and details may be made therein without departing from the spirit and scope of the invention.

What is claimed is:

1. A multiline multimode modulator for substantially simultaneously modulating a plurality of different signals onto a plurality of different output lines and in which one of n different modulations of m types may be selected for any of the output lines comprising:

a master clock means operating at a clock frequency substantially higher than the baud rate for any of the modulations to be performed and providing a first clock output at the said frequency and selectively one of m multiphase clock output signals during each period of said clock frequency;

a line control word memory including read and write control means and a number of addresses at least equal to the number of lines to be serviced for storing line control words which uniquely define the modulation to be performed for the line corresponding to the address location and responsive to said first clock output for providing line control words in a predetermined sequence;

a digital multimode modulator including a memory for storing digital numerical values representing the modulation parameters for each of the said n different modulations, digital processing circuits connected to said memory for receiving the stored digital numerical values provided thereby and responsive to the data to be modulated, the line control word signals and the selected one of m multiphase clock output signals for generating a modulated output signal as a function of the above said signals, and an address generator responsive to the data signals to be modulated, the line control and word signals, the digital processing circuits and the selected one of m multiphase clock output signals for generating a predetermined plurality of sequential address signals for supplying the memory contents of the associated addresses to the said digital processing circuits; and multiplexing means responsive to said first clock output for supplying in sequence signals from one of a plurality of sources to said digital multimode modulators and supplying the output from said multimode modulator in sequence to one of a plurality of lines.

2. A multiline multimode modulator as set forth in claim 1 in which the modulation performed for any line may be changed by writing a new line control word defining the new modulation into the address in the line control word memory associated with the line.

3. A multiline multimode modulator as set forth in claim 2 in which said m multiphase clock outputs is at least two and one provides two clock phases for controlling as FSK modulation and the other provides at least three clock phases for controlling a DPSK modulation.

4. A multiline multimode modulator as set forth in claim 3 in which said digital processing circuits includes common circuits for each of the m modulation types and a read/write memory including a pair of registers for each line for storing calculated parameters and selectively during each cycle of operation by the said line control word signals and clock phase signals.

5. A multiline multimode modulator for substantially simultaneously modulating a plurality of different signals onto a plurality of different output lines and in which one of n different modulations of m types may be selected for any of the output lines comrpising:

a master clock means operating at a first clock frequency (nfs) in which fs is substantially higher than the baud rate for any of the modulations to be performed and n is equal to the number of output lines and providing a first clock output at the said clock frequency and selectively one of m multiphase clock output signals during each period of said clock frequency;

a line control word memory including read and write control means and a number of addresses at least equal to the number of lines to be serviced for storing line control words which uniquely define the modulation to be performed for the line corresponding to the address location and responsive to said first clock frequency for providing line control words in a predetermined sequence;

a digital multimode modulator including a memory for storing digital numerical values representing the modulation parameters for each of the said n different modulations, said parameters for each of said n different modulators including a plurality of numerical values for each of the possible signal transitions which are selected at least once within each interbaud time in which a transition occurs to cause said transition to follow substantially reduced out of band frequency components, digital processing circuits connected to said memory for receiving the stored digital numerical values provided thereby and responsive to the data to be modulated, the line control word signals and the selected one of m multiphase clock output signals for generating a modulated output signal as a function of the above said signals, and an address generator responsive to the data signals to be modulated, the line control word signals, the digital processing circuits and the selected one of m multiphase clock output signals for generating a predetermined plurality of sequential address signals for supplying the memory contents of the associated addresses to the said digital processing circuits; and multiplexing means responsive to said first clock output for supplying in sequence signals from one of a plurality of sources to said digital multimode modulators and supplying the output from said multimode modulator in sequence to one of a plurality of lines.

6. A multiline multimode modulator as set forth in claim 5 in which the modulation performed for any line may be changed by writing a new line control word defining the new modulation into the address in the line control word memory associated with the line.

7. A multiline multimode modulator as set forth in claim 6 in which said m multiphase clock outputs is at least two and one provides two clock phases for controlling as FSK modulation and the other provides at least three clock phases for controlling a DPSK modulation.

8. A multiline multimode modulator as set forth in claim 7 in which said digital processing circuits includes common circuits for each of the m modulation types and a read/write memory including a pair of registers for each line for storing calculated parameters and selectively during each cycle of operation by the said line control word signals and clock phase signals.

* * * * *

UNITED STATES PATENT AND TRADEMARK OFFICE
CERTIFICATE OF CORRECTION

PATENT NO. : 3,987,374

DATED : October 19, 1976

INVENTOR(S) : Gardner D. Jones, Jr.

It is certified that error appears in the above-identified patent and that said Letters Patent are hereby corrected as shown below:

Col. 19, line 7, delete "and".

Signed and Sealed this

Twenty-first Day of December 1976

[SEAL]

Attest:

RUTH C. MASON
Attesting Officer

C. MARSHALL DANN
Commissioner of Patents and Trademarks